United States Patent [19]
Blaauboer et al.

[11] Patent Number: 5,735,710
[45] Date of Patent: Apr. 7, 1998

[54] SYSTEMS FOR CONNECTING ELECTRICAL COMPONENTS INTO AN ELECTRICAL WALL BOX

[76] Inventors: Wayne A. Blaauboer, 18-7th St., Watervliet, N.Y. 12189; Richard D. Scheufler, Jr., 21 Brookside Ave., Menands, N.Y. 12204

[21] Appl. No.: 543,990

[22] Filed: Oct. 17, 1995

[51] Int. Cl.$^6$ .............................. H01R 13/66; H01R 13/70
[52] U.S. Cl. .................... 439/535; 439/639; 439/651; 439/928
[58] Field of Search .................................. 439/701, 717, 439/535, 651, 928, 639; 174/53

[56] References Cited

U.S. PATENT DOCUMENTS

| | | | |
|---|---|---|---|
| 4,165,443 | 8/1979 | Figart et al. | 439/535 |
| 4,669,804 | 6/1987 | Munroe | 439/535 |
| 4,918,258 | 4/1990 | Ayer | 439/535 |
| 4,949,222 | 8/1990 | Bender et al. | 361/400 |
| 4,985,845 | 1/1991 | Gotz et al. | 364/492 |
| 5,254,973 | 10/1993 | Gilmore, II | 340/547 |
| 5,415,564 | 5/1995 | Winter et al. | 439/535 |
| 5,558,536 | 9/1996 | Horton | 439/535 |

FOREIGN PATENT DOCUMENTS 3426344  1/1986  Germany ....................... 439/928

*Primary Examiner*—Gary F. Paumen
*Attorney, Agent, or Firm*—Schmeiser, Olsen & Watts

[57] ABSTRACT

A system for connecting modular electrical components, like switches and wall outlets, into electrical wall boxes. There are electrical connections on the side of each electrical component to form a series of side-by-side electrical components that are to be placed into the electrical box without having to use multiple short wires between the components. There is a common power, neutral, and ground bus plane running through each electrical component which eliminates the need to manually connect each electrical component in a daisy chain. The electrical box is accessible from the rear for wiring the modular electrical components. The electrical box also has two separate cavities, one for placing the modular electrical components into, and the other for housing and attaching the electrical wiring leading to and from the electrical box.

11 Claims, 2 Drawing Sheets

SYSTEMS FOR CONNECTING ELECTRICAL COMPONENTS INTO AN ELECTRICAL WALL BOX

BACKGROUND OF THE INVENTION

1. Field of the Invention

The present invention relates to wiring electrical power in buildings. Specifically, there is a design and system for connecting modular electrical components, like switches and wall outlets, into electrical wall boxes.

2. Description of the Related Art

Electrical boxes are used to connect the electrical wiring to a variety of electrical components such as electrical outlets, and switches. Standard building wiring practices for houses, modular homes, and other light frame structures are typically done within the walls of such structures. In the construction of these buildings, the wiring is first typically "rough wired" to the various electrical component locations. Rough wiring entails pulling a supply wire into each electrical box location. The supply wiring should at least extend six inches beyond the location of the electrical box for facilitating the later attachment of electrical components. Finished wiring operations typically includes: 1) attachment of the electrical components to the extended wires, 2) pushing the electrical component and the excess wire back into the electrical box, and 3) securing a cover plate over the electrical box to provide an aesthetic appearance.

Several problems occur when there are multiple electrical components to be mounted in the same electrical box. A first problem occurs when several components must be "daisy chained" together for proper electrical operation. Daisy chaining is accomplished by first hooking up a first electrical component, (e.g., an outlet), to the supply wires that are fed to the electrical box location. Next, a second electrical component, (e.g., a switch), is attached to the first component by using several six inch long wires. The third component, (e.g., another switch), is attached to the second component in the same fashion and so on down the line of components. Thus, it is conceivable to have a string of twenty or more electrical components all attached in this awkward handling daisy chain fashion. Not only is this chain awkward to handle, but it takes a great deal of time to properly connect all of the components together.

The problems do not stop with the assembly of the daisy chain of components. Other problems occur when the daisy chained components must be crammed back into the small electrical box. Imagine all of those electrical components having many six inch long wires attached to each side. With all of that wire hanging between each component it is very difficult to shove the components back into those small electrical wall mounted boxes. Furthermore, each of those wires have portions that have the protective insulation removed therefrom. All it would take to start a fire or short out the circuitry is to have just two of those unprotected wires come in contact in that very cramped space.

Still another problem occurs after the installation of the electrical components is complete. Every time an electrical component is used, the wires are heated, which causes the wires to expand and then shrink after cooling off. This shrinking and expanding of the wires can loosen the screw-type connections used to secure the wiring to the electrical components. Given that the wires act like springs trying to uncoil themselves, when the screws loosen, these wires may become unattached or even just move a fraction of an inch, in either case a wire may come in contact with or just come close enough to another exposed wire and cause an electrical arc that could lead to a fire or short circuit. Additionally, the wire may loosen at its own screw terminal causing an arc with its own screw terminal.

Accordingly, there is a need for an electrical box design and means of attaching electrical components like switches or outlets to avoid the above stated problems of prior designs.

SUMMARY OF THE INVENTION

It is a feature of the invention to provide an apparatus and system for connecting electrical components, like switches, breakers, and outlets, to power supply wires.

It is another feature of the invention to provide a system for connecting a series of side-by-side electrical components that are to be placed into the electrical box without having to use multiple short wires between the components.

It is another advantage to provide an apparatus and system which may be retrofit into an existing electrical system.

Still another feature of the invention is that there is less risk of causing fires or short circuits by the elimination of wiring up a daisy chain of electrical components.

A further feature of the invention is to provide modular electrical components like electrical outlets and switches that have a common hot, neutral, and ground bus bar running through each component without having to manually connect individual wires therebetween.

Yet another feature of the invention is to utilize an electrical box that is accessible from the rear for wiring the modular electrical components that are residing within the electrical box.

Another feature of this present invention is to provide indicia and staggering of posts to prevent an improper connection.

Still a further feature of the invention is that the electrical box can have two separate cavities, one for placing the modular electrical components into, and the other for housing and attaching the electrical wiring leading to and from the electrical box.

Other features of the present invention will become more clear from the following detailed description of the invention, taken in conjunction with the accompanying drawings and claims, or may be learned by the practice of the invention.

It is noted that the drawings are not to scale. The drawings are merely schematic representations, not intended to portray specific parameters of the invention. The drawings are intended to depict only typical embodiments of the invention, and therefore should not be considered as limiting the scope of the invention. The preferred embodiments of the invention will be described with additional specificity and detail through the assistance of the accompanying drawings.

DETAILED DESCRIPTION OF THE PREFERRED EMBODIMENT(S) OF THE INVENTION

This disclosure of the preferred embodiment(s) of the invention is submitted in furtherance of the constitutional purposes of the United States Patent Laws "to promote the progress of science and useful arts," as stated in Article 1, Section 8 of the United States Constitution.

Figure 1:
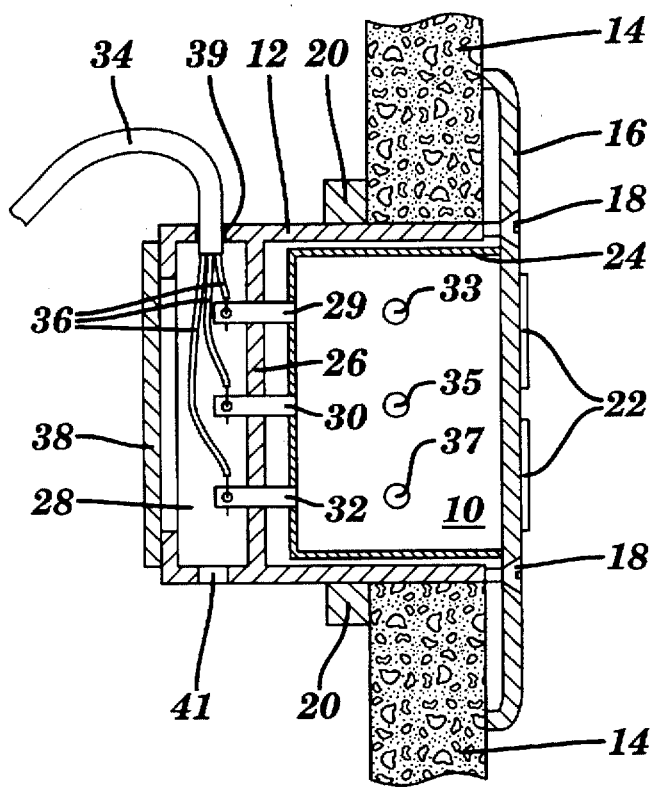
FIG. 1 is a cross sectional view of the electrical box of one embodiment of the invention.

Referring to FIG. 1, there is a cross sectional view of just one electrical component (or control) 10 in a series of components that are mounted within an electrical box 12. Although only one electrical component 10 is illustrated, it is contemplated to have many side by side mounted components placed within one electrical box 12. The electrical box 12, herein referred to as a box, is typically mounted into a dry wall 14 structure. A cover plate 16 is mounted over the box front to secure box 12 to dry wall 14 by use of screws 18. Screws 18 are connected to an attachment means 20 that secures box 12 to wall 14. Attachment means 20 can be of any design, and could be similar to what is taught by U.S. Pat. No. 5,221,814 and is herein incorporated by reference. Electrical outlets 22, project through the cover plate 16. Female couplings 33, 35, and 37 are located on the side of component 10.

Electrical component 10 is mounted into a front box cavity 24. Box wall 26 separates the front cavity 24 from a back box cavity 28. Wire connection posts 29, 30 and 32 extend from the component 10 through wall 26 and into back cavity 28. Box wall 26 may be manufactured with appropriate holes or slots such that the posts 29, 30 and 32 of component 10 either snap through or merely slide through the box wall 26. Moreover, the component 10 itself can be manufactured to snap in place inside of the front cavity 24.

Electrical power supply cable 34 enters the back cavity 28 through hole 39 located within the wall of box 12. Although not shown, a coupling device may be incorporated at hole 39 to securely hold cable 34 in place. Hot, ground, and neutral wires, generally numbered as 36 and referred to as wires, are separately coupled to the appropriate posts 29, 30, and 32. A bottom wire hole 41 is located in the wall of the back cavity and is used for inserting an output cable (not shown). Output cables are used to connect an electrical switch component to the appropriate electric lights. Back cover plate 38 is releasably secured to box 12. An alternative embodiment is also envisioned whereby the box 12 provides a means wherein power supply cable 34, or its individual lead wires, can simply plug into the back wall 26 to supply power to component 10.

Figure 2:
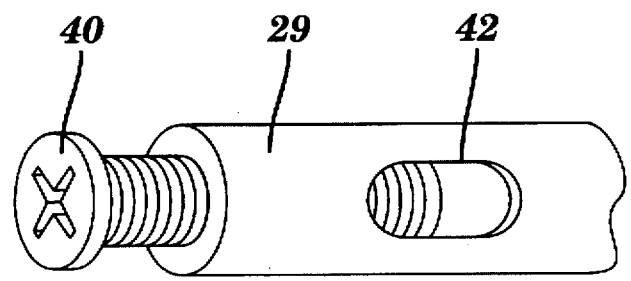
FIG. 2 is a perspective view of a wire connection post from FIG. 1.

Referring to FIG. 2, there is illustrated an enlarged perspective view of the wire connection post 29 (referred to as a post) from FIG. 1. Post 29 has a screw 40 mounted at its end and a hole 42 extending perpendicularly through post 29 as illustrated. Thus, in operation, by extending wire 36 into and through hole 42, electrical contact is secured for electrical component 10 by tightening down screw 40. It should be appreciated that alternate means for wire attachment are also envisioned. For instance, a spring loaded clamping device or a wire nut type device could be used to achieve the same functionality.

Figure 3:
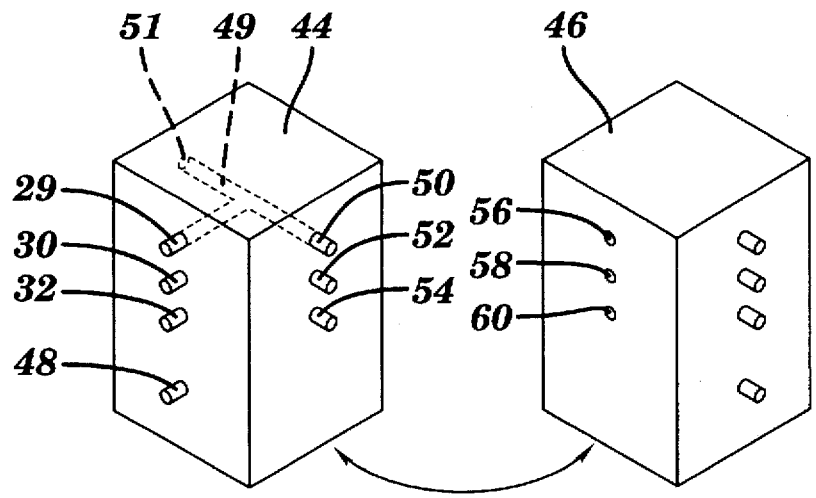
FIG. 3 is a perspective view of the back side of two electrical components that are to be coupled together.
Figure 4:
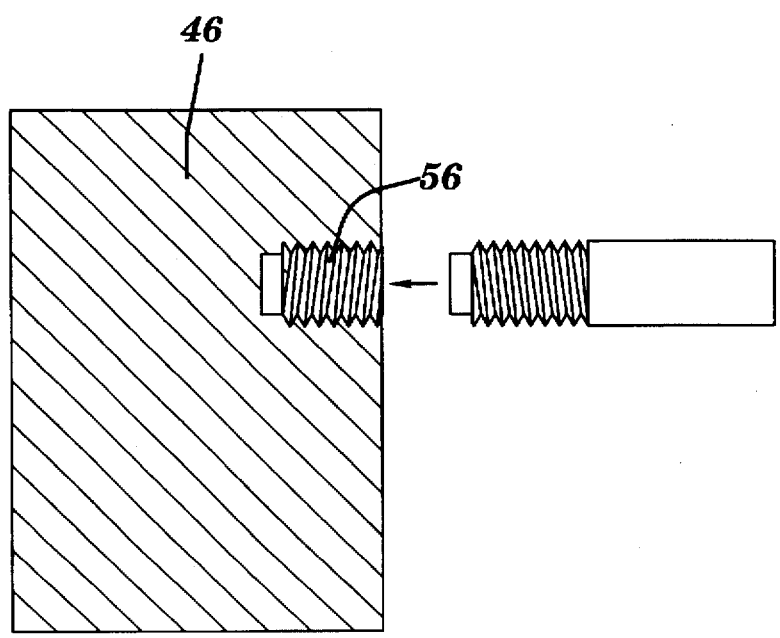
FIG. 4 is a cross sectional view of an electrical box showing a threadable prong in accordance with a preferred embodiment of the present invention.

Referring to FIG. 3, there is illustrated a perspective view of two electrical components 44 and 46 to be coupled together in series. For illustrative purposes, component 44 is a switch, and component 46 is an outlet. Both components 44 and 46 require connection to all three input wires (hot, ground, and neutral). Electrical output post 48 on component 44 is for connecting an output line that is for connecting power to a light socket or some other device. There are three threadably mounted prongs 50, 52, and 54 located on one side of each component, and three female couplings (or prong receptacles) 56, 58, and 60 located on the other side of each component. Both the male and female coupling means may be integrally molded onto the sides of the components (i.e., control means) 44 and 46. Each post is internally coupled to an associated coupling and prong by an electrical bus connection, which is illustrated by coupling prong 50, female coupling 51, and post 29 together with bus 49.

In operation of the invention, and in reference to all of the above figures, electrical component 44 can be placed in secure alignment with component 46 by inserting prongs 50, 52, and 54 into the associated couplings 56, 58, and 60, forming a chain of two electrical components. The prongs on the side of component 46 (FIG. 24) are removed by unthreading them to allow the chain of two components to be placed and secured into front cavity 24 of box 12. Note that box 12 can be manufactured as a single, or multiple component box, depending on the specific needs of the installer.

Electrical wires 36 (FIG. 1) are coupled to only one of the electrical component's posts, for example component 44. The posts are extending into back cavity 28 for easy attachment of the wires to the posts. An output cable (for a light fixture, etc.) has its hot wire attached to output post 48, and the neutral wire is attached to the neutral post (either post 29, 30, or 32 as appropriate) that is also being used to secure the input neutral wire.

Thereafter, back cover plate 38 is secured to box 12. A cover plate 16 is placed over the front of box 12. Box 12 may then placed into a cut out section in dry wall 14. Screws 18 may be incorporated into the box design to cause the attachment means 20 to pop up from a recessed position within box wall 12 to securely hold the dry wall between plate 16 and attachment means 20.

One skilled in the art of electrical building wiring will appreciate the advantages of the present invention. The use of a bus 49, coupling 56, and removable side prong 50 have eliminated the inherent hassles of connecting a daisy chain using a short cumbersome wire. The prongs 50, 52, 54 and couplings 56, 58 and 60 may contain indicia or color coding (e.g. H, N, G for hot neutral and ground) as well as staggered spacing to prevent an improper connection. The securing of wires 36 to the posts in a separate rear box cavity has eliminated the problem of fighting to cram the electrical components into a tight electrical box now filled with too many electrical wires. This invention will guarantee that the wires will easily fit into the electrical box. The use of screw-type attachment posts (as illustrated in FIG. 2) has eliminated both the hassle of bending wires around a screw for attachment, and the fire potential caused by arcing or short circuits due to loose wires.

Although the invention has been described in reference to the specific elements illustrated in the drawings, there are many variations to the invention that are easily known to one skilled in the art. For instance, wall 26 need not be a complete extensive wall, a small ridge around the inside of the box wall would work; and it may even be possible to eliminate any type of wall completely. Although a particular attachment means 20 has been illustrated, any known means of attaching the box to the building structure is suitable. Similarly, any method of attaching the bus (i.e., bus 49) to the electrical component is suitable and can be easily implemented, (e.g., using a printed circuit board). It is also contemplated to place the wire buses, i.e. bus 49, within the box structure and not being located in the electrical components. In this bus arrangement, the electrical components could operate like a plug being placed into an electrical outlet-type receptacle that would be mounted within the front cavity of the electrical box. Thus, upon plugging in the electrical component the plug prongs would come into contact with the appropriate busses (now located in the box) for that component. The shape of the wire connection posts and prongs are generally illustrated as being rod shaped, however any type of shape and configuration will suffice for the intended purposes. For example, the wire connection posts could be alligator clips that would pinch onto a wire. Also, the prongs could be bayonet shaped or any known means of fastening two items together. In addition, the number of posts, prongs and female coupling devices may vary depending upon the actual electrical component being used.

While the invention has been taught with specific reference to these embodiments, someone skilled in the art will recognize that further changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A system for wiring a building, comprising:
   a) a box for containing electrical controls wherein said box comprises a wall located on the interior of the box for defining a front and back cavity within the box, the wall including at least one hole therein; and
   b) control means, mounted within the box, for providing user control of electricity, and including coupling means, on each side of the control means, for both physically and electrically coupling two adjacent control means, said control means further comprising wire connection means extending from a back side of the control means and into the back cavity for connecting a power supply wire to the control means, said wire connection means comprising a longitudinal rod having a wire hole that is oriented perpendicular to the longitudinal axis of the rod for receiving an electrical wire therethrough, a screw threaded longitudinally into the rod, and the screw positioned to be tightened upon the electrical wire when extending through the wire hole.

2. The system of claim 1, wherein the coupling means further comprises:
   a prong being longitudinally shaped and being located on one side of the control means; and
   a receptacle, shaped to securely fasten about the longitudinally shaped prong, and located on an other side of the control means.

3. The system of claim 1, wherein the box further comprises a removable back cover, removably attachable to a back side of the box.

4. An integral electrical component retrofittable into a preexisting gangbox, comprising:
   a from surface, first and second side surfaces, and a rear surface;
   an electrical control system having control means permanently secured to said component for providing user control of electrical power;
   a coupling system including a plurality of wireless connectors permanently connected to said control means and located on said first side surface for wireless transferring of electrical power to an adjacent electrical component; and
   a power input system on said rear surface to secure electrical wiring directly thereto for providing electrical power to said component.

5. The electrical component of claim 4 wherein said plurality of wireless connectors include prongs.

6. The electrical component of claim 4 wherein said coupling system further includes a plurality of receptacles on said second side surface of said electrical component.

7. The electrical component of claim 5 wherein said prongs are located in a coplanar manner parallel to a back surface of said gang box.

8. The electrical component of claim 5 wherein said electrical component is a switch.

9. The electrical component of claim 5 wherein said electrical component is an outlet.

10. An electrical wiring system including a plurality of integral electrical components retrofittable into a preexisting gangbox,
   a) a first one of said components comprising:
      a front surface, first and second side surfaces, and a rear surface;
      an electrical control system having control means permanently secured to said component for providing user control of electrical power;
      a coupling system including a plurality of wireless connectors permanently connected to said control means and located on said first side surface for wireless transferring of electrical power to an adjacent electrical component; and
      a power input system on the rear surface of said component to secure electrical wiring directly thereto for providing electrical power to said component;
   b) a second one of said components comprising:
      a front surface, first and second side surfaces, and a rear surface;
      an electrical control system having control means permanently secured to said component for providing user control of electrical power;
      a coupling system including a first plurality of wireless connectors permanently connected to said control means and located on said first side surface for wireless transferring of electrical power to an adjacent electrical component; and
      a second plurality of wireless connectors permanently connected to said control means and located on said second side surface for wireless receipt of electrical power from the wireless connectors of said first electrical component.

11. An integral electrical component retrofittable into a preexisting gangbox, comprising:
   a front surface, first and second side surfaces, and a rear surface;
   an electrical control system having control means permanently secured to said component for providing user control of electrical power;
   a coupling system including a plurality of wireless connectors permanently connected to said control means and located on said first side surface for wireless transferring of electrical power to an adjacent electrical component; and
   a power input system having screw means to secure electrical wiring directly thereto for providing electrical power to said component.

* * * * *